Jan. 25, 1966 T. J. HOSEA 3,230,592

MOLDING STRIP FASTENER

Filed Nov. 7, 1963

INVENTOR.
Thomas J. Hosea
BY
J.J. Soucek

United States Patent Office 3,230,592
Patented Jan. 25, 1966

3,230,592
MOLDING STRIP FASTENER
Thomas J. Hosea, Grosse Pointe Woods, Mich., assignor to General Motors Corporation, Detroit, Mich., a corporation of Delaware
Filed Nov. 7, 1963, Ser. No. 322,144
2 Claims. (Cl. 24—73)

This invention relates to a fastening means for mounting an object on a panel, and more particularly to a plastic fastener for mounting a sealing strip to an automobile door frame or the like. Sealing strips, or weather strips, are presently used to seal automobile door frames against the ingress of dirt, moisture and other foregin matter. Various methods have been utilized to mount these sealing strips to the door frame, the most successful being the use of a fastener of the type disclosed in Ziffer Patent 3,020,606.

Previous fasteners, such as the Ziffer fastener, have been developed with a deformable flange or with radially deformable arms to secure the sealing strip to an apertured door frame. A further advance in the art, as shown in the Ziffer patent, was to include a circumferential sealing flange to seal the apertures which receive the fastener against the ingress of foreign matter, thus eliminating the need for caulking compounds which have heretofore proven inefficient and undesirable. However, such fasteners have been characterized by two faults: (1) The fasteners require a rather substantial amount of force in order to be inserted through the apertures in a door frame; and (2) since these fasteners are plastic and made by an injection molding process, the relief slots or holes required by the flanges or arms require a more complicated operation and entail higher manufacturing costs.

It is therefore an object of this invention to provide a fastener for mounting objects to apertured panels wherein the fastener is easily insertable through the apertures with a minimum amount of force. It is another object of this invention to provide a plastic fastener for mounting objects to apertured panels wherein the fastener also serves to sealingly close the aperture. It is a further object of this invention to provide a plastic fastener which does not require the inclusion of relief slots or holes and thus is less expensive to produce.

Additional objects and advantages of the present invention will be apparent from the following description and the drawings wherein.

Figure 1:
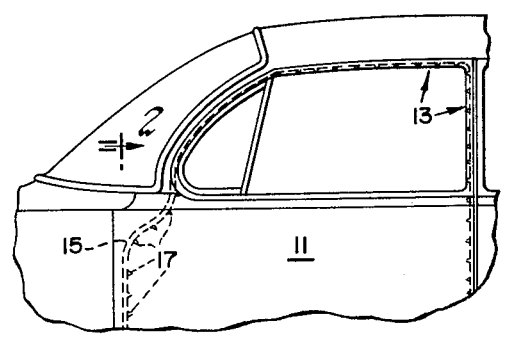
FIGURE 1 is a fragmentary side view of an automobile body showing the locus of use of the present invention.
Figure 2:
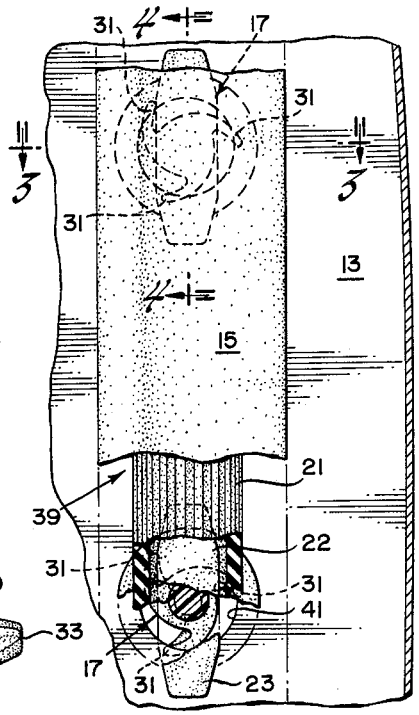
FIGURE 2 is a partial sectional view taken along line 2—2 of FIGURE 1.
Figure 3:
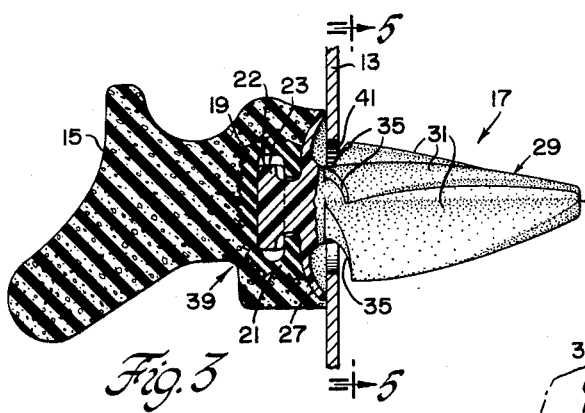
FIGURE 3 is a partial sectional view taken along line 3—3 of FIGURE 2.
Figure 4:
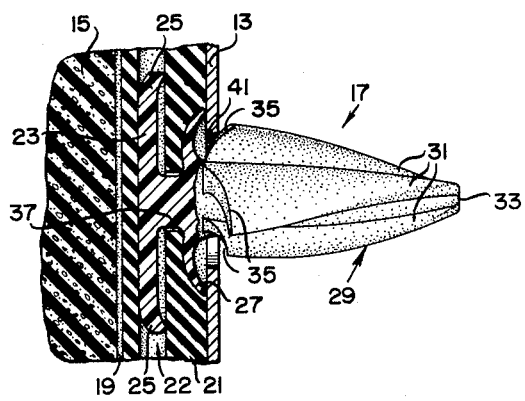
FIGURE 4 is a partial sectional view taken along line 4—4 of FIGURE 2.
Figure 6:
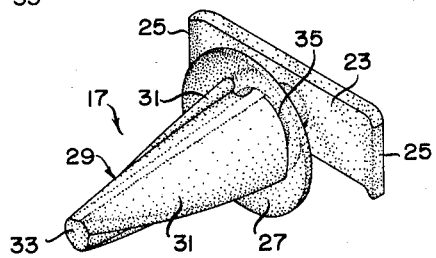
FIGURE 6 is a perspective view of the present invention.

Referring to FIGURE 1, an automobile body 11 is shown having a door frame 13 to which is attached a sealing or weather strip 15 by means of a plurality of fasteners 17. Referring to FIGURES 2 through 4, the sealing strip 15 may be of any convenient design and made of any suitable elastomeric material. The sealing strip 15 has a longitudinal, ribbed slot 19 formed in its inner face. A C-shaped sleeve 21 having a mating ribbed outer periphery is receivable within the slot 19. The sleeve 21 has an interior slot 22 to receive the fasteners 17. The sleeve 21 is of a generally less pliable material than the sealing strip 15 in order to provide a more rigid grasp on the fasteners 17. As additionally shown in FIGURE 6, each fastener 17, which is preferably made of plastic, includes a substantially rectangular head portion 23 which is down-turned at its tips 25. An intermediate circular flange portion 27 is spaced from the head portion 23 and is dished downwardly. A shank portion 29 of the fastener 17 includes a plurality of radially extending arcuate flutes 31 which are divergingly tapered from the shank tip 33 and terminate in shoulders 35 intermediate the fastener 17. The flute shoulders 35 are preferably inclined or tapered in order that panels of varying thicknesses may be accommodated.

Figure 5:
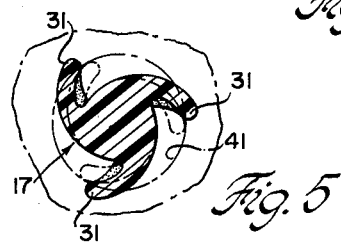
FIGURE 5 is a sectional view taken along the line 5—5 of FIGURE 3.

In order to mount the sealing strip 15 to door frame 13, the head portions 23 of a plurality of fasteners 17 are inserted into the slot 22 of sleeve 21 through holes 37 provided therefor. The downturned tips 25 serve to wedge the fastener head 23 within the sleeve 21. Sleeve 21 is then introduced into the sealing strip slot 19. The sealing strip assembly 39 is then simply placed against the door frame 13 and the fasteners are pushed through mating apertures 41 provided therefor. As seen in FIGURE 5, the flutes 31 easily deform circumferentially to a position D shown in broken lines as each fastener 17 is pushed through an aperture 41 and then snap back to their original position to bind the frame 13 between the flute shoulders 35 and the periphery of flange 27. Flange 27 serves the additional function of sealing the aperture 41 against the ingress of moisture and foreign matter, thus obviating the need for any caulking. Any number of flutes 31 will suffice; however, a minimum of three as shown as recommended to insure stable retention of the fastener 17 within the panel aperture 41.

Testing has shown that the use of an insert as described above with the sealing strip and fasteners facilitates assembly and insures a stronger connection than if the fasteners were secured directly to the sealing strip. A direct connection would be desirable if the object to be fastened were more rigid.

Plastic fasteners of this type are made by the injection molding process. Objects so made by this process having holes or intricate annular slots such as the Ziffer fastener are expensive to make, while objects with radial fins, such as the present fastener, are relatively cheaper to produce.

Thus, by providing the fastener with circumferentially deformable flutes, the need for relief holes or slots is obviated. The flutes are also more easily deformable than are the radially flexible barbs or arms used in fasteners heretofore, because of the tendency of the flutes to wrap around the fastener shank. Upon insertion into a panel aperture, the flutes easily unwind to provide both an axial and a radial wedging action in cooperation with the slightly deformed flange.

This fastener may, of course, be used in a variety of other applications, such as mounting decorative molding strips or medallions to body panels. Other uses could fall outside of the automotive field and the fastener could readily be utilized to mount any object to any panel.

While the embodiment of the present invention as herein disclosed constitutes a preferred form, it is understood that other forms might be adopted without departing from the spirit of the invention.

What is claimed is:
1. A plastic fastener for securing an object to a panel having an aperture therein comprising a head portion attachable to said object, an intermediate flexible downwardly-dished sealing portion, and an elongated shank portion including a plurality of resilient circumferentially spaced arcuate flutes normally extending radially and circumferentially from said shank portion, said flutes each divergingly tapering from the shank tip and terminating in an inclined shoulder portion adjacent said dished por- tion, said flutes deforming circumferentially and radially inwardly from said normal position upon insertion through said aperture and returning toward said normal position until said shoulder portions engage said panel to cooperate with said sealing portion to secure said fastener to said panel and to sealingly close said aperture.

2. The fastener as claimed in claim 1 wherein said flutes extend from said shank portion in a common circumferential direction in a swirl-like manner and said flutes deform circumferentially and radially inwardly in said common direction upon insertion through said aperture.

References Cited by the Examiner
UNITED STATES PATENTS

| | | | |
|---|---|---|---|
| 2,125,018 | 7/1938 | Hamill | 85—70 |
| 2,976,345 | 3/1961 | Whitted | 151—41.75 |
| 2,983,008 | 5/1961 | Von Rath | 24—73 |
| 3,037,596 | 6/1962 | Fordyce | 24—73 |
| 3,119,299 | 1/1964 | Sarafinas | 85—5 |

WILLIAM FELDMAN, *Primary Examiner.*
DONLEY J. STOCKING, *Examiner.*

UNITED STATES PATENT OFFICE
CERTIFICATE OF CORRECTION

Patent No. 3,230,592                                                      January 25, 1966

Thomas J. Hosea

It is hereby certified that error appears in the above numbered patent requiring correction and that the said Letters Patent should read as corrected below.

Column 1, line 13, for "foregin" read -- foreign --; column 2, line 32, for "as", second occurrence, read -- is --; column 4, after line 8, insert the following:

3,177,540    4/1965    Hall et al.--------24-73

Signed and sealed this 27th day of December 1966.

(SEAL)
Attest:

ERNEST W. SWIDER                                          EDWARD J. BRENNER
Attesting Officer                                                Commissioner of Patents